United States Patent Office 3,466,322
Patented Sept. 9, 1969

3,466,322
ALKYL TRIALKYLVINYL SULFIDES
Edward U. Elam, Kingsport, Tenn., assignor to Eastman Kodak Company, Rochester, N.Y., a corporation of New Jersey
No Drawing. Continuation-in-part of application Ser. No. 220,061, Aug. 28, 1962. This application Apr. 27, 1965, Ser. No. 451,330
Int. Cl. C07c *149/20;* C07d *63/10, 91/44*
U.S. Cl. 260—481         5 Claims

ABSTRACT OF THE DISCLOSURE

Process for the preparation of alkyl trialkylvinyl sulfides by the reaction of a mercaptan with a 3-hydroxy-2,2,4-trialkylalkenoic acid β-lactone in the presence of ultraviolet light and a free-radical producing catalyst, the products of the process being useful as stabilizers for polyolefins and is antioxidants for rubber.

---

This invention relates to a process for the preparation of trialkylvinyl sulfides wherein certain lactones are reacted with mercaptans in the presence of free-radical producing catalysts.

This application is a continuation-in-part of Elam, U.S. patent application Ser. No. 220,061 filed Aug. 28, 1962, now abandoned.

The trialkylvinyl sulfides of the invention have the general Formula I

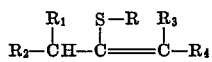

wherein:

R represents either (1) an alkyl radical, i.e. either unsubstituted alkyl, straight or branch-chained, preferably of from 1 to 12 carbon atoms, e.g., methyl, ethyl, propyl, butyl, pentyl, decyl and dodecyl or substituted alkyl such as carbomethoxymethyl, benzyl, phenoxyethyl, etc.; or (2) a monocyclic aryl group of the benzene series such as phenyl and substituted phenyl groups including methoxyphenyl, o-tolyl, etc.; or (3) a heterocyclic radical such as thiazolyl, thiophen, benzoxazolyl, benzothiazolyl, oxadiozolyl, tetrazolyl, thiadiazolyl, triazolyl, etc.

$R_1$, $R_2$, $R_3$ and $R_4$ each represents the same or different lower alkyl groups.

The trialkylvinyl sulfides are prepared by the reaction of certain lactones with mercaptans or thiols, such as those containing the radicals represented by R in the above formula, e.g., 1-pentanethiol, 1-phenyl-5-mercaptotetrazole, methylmercaptoacetate, methyl, ethyl, decyl, dodecyl, and octadecyl mercaptans containing 1 to 18 carbon atoms in the alkyl chain, decane-1,10-dithiol, 1-thiosorbitol, mercaptopropionic acid esters, thiophenol, mercaptothiophenes, thiourea, etc., in the presence of a free-radical producing catalyst such as an azo or peroxide free-radical producing catalyst. The aliphatic mercaptans of 1 to 12 carbon atoms are especially useful in the reaction. Mercaptans, in general, are useful in the process to obtain the above sulfides (I) of disclosed utility. However, any mercaptans tending to react with the catalyst rather than the lactone should naturally be avoided. Accordingly, the mercaptains should be free of unsaturated radicals reactive with the catalyst to substantially change the course of the reaction.

The lactones reacted with the mercaptans are 3-hydroxy-2,2,4-trialkylalkenoic acid β-lactones having the general Formula II

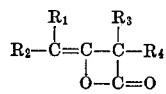

wherein $R_1$, $R_2$, $R_3$ and $R_4$ represent the same or different lower alkyl groups such that each may represent the same alkyl group such as methyl, or $R_1$ and $R_3$ may be a different alkyl group than represented by $R_2$ and $R_4$ as illustrated in the examples below. The lactones are prepared in the manner described by Hasek, Clark, Elam and Marton, J. Org. Chem. 27, 60 (1962) from the appropriate dialkyl ketene.

These lactones are similar in structure to diketene,

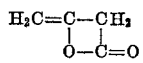

However, insofar as the present invention is concerned, the similarity does not extend beyond that point because the reaction of mercaptans with the two lactones using free-radical catalyst takes different courses. That is, the reaction with diketene and a mercaptan proceeds with the formtaion of a β-lactone as follows:

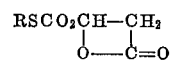

as shown by the literature, U.S. Patent 2,675,392. On the other hand, according to the present invention, the β-lactones of Formula II above unexpectedly produce the trialkylvinyl sulfides of Formula I above by reaction with the mercaptans under the same conditions. Thus, in the process of the invention, the sulfur atom becomes attached to the carbon atoms of the β-lactone to which oxygen was originally attached rather than to the terminal carbon atom, which appears to lead to the spontaneous decarboxylation of the lactone. It will be noted that when the monomercapto compounds are used in the reaction monoadducts are obtained and with dimercapto compounds di-adducts are obtained.

The free-radical producing catalysts employed in the reaction are those known particularly in the polymerization art and in other reactions catalyzed by free radicals, including ultraviolet light, azo free-radical producing polymerization catalysts described in U.S. Patent 2,471,959, e.g., azo diisobutyronitrile, carbamylazoisobutyronitrile, alpha,alpha′-azobis-(alpha,gamma-dimethylvaleronitrile), dimethyl alpha, alpha′-azodiisobutyrate, combinations of oxidizing-reducing agents such as hydrogen peroxide/hydrazines, titanous or vanadous salts with peroxide polymerization catalysts such as diacylperoxides, e.g., benzoyl peroxide, alkyl peroxides such as di-t-butyl-peroxide, lauroyl peroxide, hydrogen peroxide and peracid salt catalysts such as ammonium persulfate. The amount of catalyst can be varied widely depending on the reactants, the activity of the catalyst and conditions of reaction but may vary from about 0.001% to 10% preferably 0.01% to 5% based upon the amount of lactone used. If desired, ultraviolet light from sunlight or other source of high energy radiation may be employed for the production of free-radical catalyst, alone or in conjunction with the other free-radical catalysts to promote the reaction.

Molar proportions of the lactones and monomercaptans can be used with either reactant in excess, varying the proportions accordingly when the dimercaptans are used and di-adducts are prepared.

The process can be carried out over a wide range of temperature and time of reaction; in general, temperatures from about 25° C. to 150° C. are useful.

The trialkylvinyl sulfide compounds of the invention are useful as stabilisers for polyolefins such as ethylene and propylene polymers and as antioxidants for rubber.

An inert solvent may be used in the reaction if desired including aliphatic hydrocarbons, e.g., hexane, decane, cyclohexane; ethers, e.g., diethyl ether and dioxane.

The following examples will serve to illustrate the method of preparation of the trialkylvinyl sulfides of the invention.

Example 1

(1) A mixture of 140 g. of 3-hydroxy-2,2,4-trimethyl-3-pentenoic acid β-lactone, 53 g. of methyl mercaptoacetate, and 5 g. of azodiisobutyronitrile is heated to 75–80° C. for about 65 hours. Distillation of the product gives, after removal of unreacted starting material, 28.6 g. of methyl 2(1 - isopropyl-2-methylpropenylmercapto) acetate, B.P. 90–95° C. (3 mm.), $n_D^{20}$ 1.4860.

Analysis.—Calcd. for $C_{10}H_{18}SO_2$: C, 59.4; H, 8.9; S, 15.8; sapon. equiv., 202. Found: C, 59.1; H, 8.9; S, 15.7; sapon. equiv., 195.

The sulfide has the formula

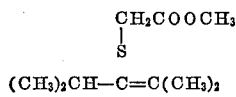

Example 2

A mixture of 140 g. of 3-hydroxy-2,2,4-trimethyl-3-pentenoic acid β-lactone, 50 g. of 1-pentanethiol, and approximately 0.5 g. of azodiisobutyronitrile is heated to 80° C. for approximately 24 hours with occasional addition of small amounts of azodiisobutyronitrile. Distillation gives, after removal of low-boilers, 36 g. of pentyl 1-isopropyl-2-methylpropenyl sulfide, B.P. 90–95° (4 mm.), $n_D^{20}$ 1.4780.

Analysis.—Calcd. for $C_{12}H_{24}S$: S, 16.0. Found 16.0.

The sulfide has the formula

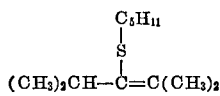

The compound is characterized by conversion to the 2,4-dinitrophenylhydrazone of 2,4-dimethyl-3-pentanone, identical by M.P., mixed melting point, and analysis with an authentic sample. This compound hydrolyzes according to the equation.

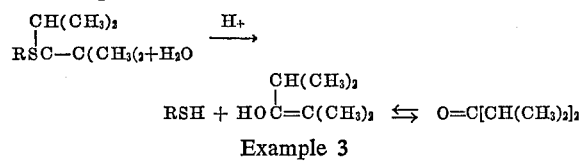

Example 3

The procedure of Example 2 is repeated with 1-pentanethiol and 2-butyl-2,4-diethyl-3-hydroxy-3-octenoic acid β-lactone. The yield of 2-ethyl-1-(1-ethylpentyl)-1-hexenyl pentyl sulfide,

is 25%.

Example 4

A mixture of 28 g. of 3-hydroxy-2,2,4-trimethyl-3-pentenediol β-lactone and 10 g. of 1-pentanediol is heated to 80° C. and treated with approximately 0.3 g. of lauroyl peroxide. Heating at 80–95° C. is continued for 2¼ hours, during which time an additional 0.2 g. of lauroyl peroxide is added in small increments. At the end of this time, the material is sampled and analyzed by gas chromatography. The chromatogram shows an approximately 20% conversion to pentyl 1-isopropyl-2-methylpropenyl sulfide, the identity of which is confirmed by comparison with the chromatogram of a known sample.

Example 5

A mixture of 50 grams (.3 mole) of 2-mercaptobenzothiazole, 42 grams (0.3 mole) of 3-hydroxy-2,2,4-trimethylpentenoic acid β-lactone and .8 gram of di-tert.-butyl peroxide is heated with stirring at 150° C. for 12 hours. After cooling, the crude reaction production is dissolved in 800 ml. of benzene and washed with 10% NaOH solution to remove unchanged 2-mercaptobenzothiazole. An evaporation of the benzene solution gives 25.3 gms. (32%) crude 2(1-isopropyl-2-methylpropenyl)thiobenzothiazole

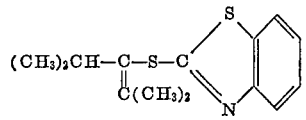

as a low melting solid.

Example 6

A solution of 101.2 grams (.5 mole) of 1-dodecane thiol in 140 gms. (1.0 mole) of 3-hydroxy-2,2,4-trimethylpentenoic β-lactone in 500 ml. of $CCl_4$ is irradiated for 24 hours with a high pressure mercury arc lamp with an internal probe immersed in the liquid. The gas evolved is identified as $CO_2$. Distillation of the resulting solution yields unchanged materials, together with 36 grams of dodecyl 1-isopropyl-2-methylpropenyl sulfide,

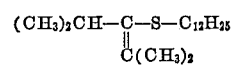

B.P. 134–136° C. at 0.5 mm.

Example 7

A mixture of 62 grams (1 mole) ethanethiol in 140 gms. (1 mole) of 3-hydroxy-2,2,4-trimethylpentenoic β-lactone containing 1 gm. of di-tert.-butyl peroxide is charged into a stainless steel autoclave and heated at 150° C. for 8 hours. During this period, every hour an additional 0.5 gm. of di-tert-butyl peroxide dissolved in 10 gm. of the lactone is pumped into the autoclave. After cooling, the autoclave is vented to a hood and the contents treated with NaOH solution to remove the excess ethanethiol. The remaining organic material is distilled through a 10-inch packed column to give 95.5 gms. of ethyl 1-isopropyl-2-methyl propenyl sulfide,

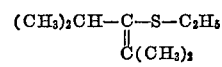

B.P. 72–76° C.

Methane thiol can be used in the process of Example 7 in place of ethanethiol also carrying out the reaction in the autoclave because of the low boiling point of methanethiol.

In the manner of the above examples a wide variety of the other mercaptans indicated above may be reacted with the 3-hydroxy-2,2,4-trialkylalkenoic acid β-lactones (II) in the presence of the free-radical catalysts to prepare the corresponding trialkylvinyl sulfides.

The invention has been described in considerable detail with particular reference to certain preferred embodiments thereof, but it will be understood that variations and modifications can be effected within the spirit and scope of the invention as described hereinabove, and as defined in the appended claims.

I claim:

1. A process for preparing compounds having the formula

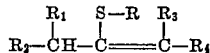

which comprises heating a mercaptan of the formula RSH with a lactone having the formula

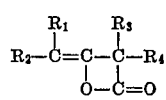

at a temperature of about 25° C. to about 150° C. in the presence of a free radical-producing catalyst selected from the group consisting of ultraviolet light, or from about 0.001 to 10 weight percent, based on the amount of lactone, of azodiisobutyronitrile, carbamylazoisobutyronitrile, α,α'-azobis-(α,γ-dimethyl-valeronitrile), dimethyl α,α'-azodiisobutyrate, hydrogen peroxide/hydrazine, benzoyl peroxide, di-t-butylperoxide, lauroyl peroxide, hydrogen peroxide and ammonium sulfate, wherein:

R represents alkyl of 1 to 18 carbon atoms, carbomethoxy methyl, phenyl, lower alkoxyphenyl, or 2-benzothiazolyl; and $R_1$, $R_2$, $R_3$ and $R_4$ are the same or different and each represents lower alkyl.

2. A process according to claim 1 wherein R represents alkyl of 1 to 12 carbon atoms or carbomethoxy methyl.

3. A process according to claim 2 wherein the concentration of the catalyst is 0.01% to 5%.

4. A process according to claim 1 wherein the catalyst is azodiisobutyronitrile, lauroylperoxide, or di-tert-butyl peroxide.

5. A process according to claim 4 wherein $R_1$, $R_2$, $R_3$ and $R_4$ represent methyl.

No references cited.

JAMES A. PATTEN, Primary Examiner

E. GLEIMAN, Assistant Examiner

U.S. Cl. X.R.

204—158; 252—406; 260—45.7, 302, 306, 307, 308, 309, 329, 593, 609, 632